(12) United States Patent
Takenaka et al.

(10) Patent No.: US 8,809,795 B2
(45) Date of Patent: Aug. 19, 2014

(54) IMAGING APPARATUS, RADIATION IMAGING SYSTEM, CONTROLLING METHOD OF IMAGING APPARATUS, AND RECORDING MEDIUM RECORDING CONTROL PROGRAM OF IMAGING APPARATUS

(75) Inventors: Katsuro Takenaka, Honjo (JP); Tadao Endo, Honjo (JP); Toshio Kameshima, Kumagaya (JP); Tomoyuki Yagi, Honjo (JP); Keigo Yokoyama, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 386 days.

(21) Appl. No.: 12/422,474

(22) Filed: Apr. 13, 2009

(65) Prior Publication Data

US 2009/0272909 A1 Nov. 5, 2009

(30) Foreign Application Priority Data

Apr. 30, 2008 (JP) ................. 2008-118804

(51) Int. Cl.
*G01T 1/24* (2006.01)
*G01T 1/29* (2006.01)

(52) U.S. Cl.
CPC .................... *G01T 1/2928* (2013.01)
USPC .................................................. 250/370.08

(58) Field of Classification Search
USPC .................................................. 250/370.08
See application file for complete search history.

(56) References Cited

U.S. PATENT DOCUMENTS

| | | | |
|---|---|---|---|
| 6,952,015 B2 | 10/2005 | Kameshima | 250/370.11 |
| 7,012,260 B2 | 3/2006 | Endo | 250/370.09 |
| 7,227,926 B2 | 6/2007 | Kameshima et al. | 378/98.9 |
| 7,381,963 B2 | 6/2008 | Endo et al. | 250/370.09 |
| 7,408,167 B2 | 8/2008 | Kameshima et al. | 250/370.09 |
| 7,466,345 B2 | 12/2008 | Kameshima et al. | 348/220.1 |
| 7,470,911 B2 | 12/2008 | Yagi | 250/370.14 |
| 7,491,960 B2 | 2/2009 | Takenaka et al. | 250/580 |
| 7,514,663 B2 | 4/2009 | Yagi et al. | 250/208.1 |
| 7,514,690 B2 | 4/2009 | Endo et al. | 250/370.14 |
| 7,541,591 B2 | 6/2009 | Endo et al. | 250/369 |

(Continued)

FOREIGN PATENT DOCUMENTS

| | | |
|---|---|---|
| JP | 04-073969 | 3/1992 |
| JP | 9-307698 | 11/1997 |
| JP | 2005-303720 | 10/2005 |
| JP | 2007-104219 | 4/2007 |

OTHER PUBLICATIONS

Office Action issued Oct. 9, 2012 in Japanese counterpart application 2008-118804.

*Primary Examiner* — David Porta
*Assistant Examiner* — Shun Lee
(74) *Attorney, Agent, or Firm* — Fitzpatrick, Cella, Harper & Scinto

(57) ABSTRACT

An imaging apparatus includes a transmitting path to transmit the output electric signal, and a read-out circuit performing a sampling and holding operation for holding the electric signal read out through the transmitting path, and performing a reset operation to reset the transmitting path, and includes a control unit for controlling an outputting drive circuit and a read-out circuit so as to perform the sampling and holding operation row by row after a start of the output operation, to perform the reset operation after the sampling and holding operation, and to terminate the output operation after the reset operation. This can reduce the frame time without reducing the S/N ratio of the image signal.

5 Claims, 8 Drawing Sheets

(56) References Cited

U.S. PATENT DOCUMENTS

| | | |
|---|---|---|
| 7,550,733 B2 | 6/2009 | Endo et al. ............... 250/370.09 |
| 7,564,038 B2 | 7/2009 | Endo et al. ............... 250/370.11 |
| 7,573,038 B2 | 8/2009 | Yokoyama et al. ...... 250/370.09 |
| 7,592,599 B2 | 9/2009 | Kameshima ............. 250/370.09 |
| 7,839,977 B2 | 11/2010 | Kameshima et al. ......... 378/116 |
| 2001/0012070 A1 | 8/2001 | Enod et al. .................... 348/302 |
| 2002/0050940 A1 | 5/2002 | Sato et al. ..................... 341/155 |
| 2004/0079865 A1* | 4/2004 | Hoshi ........................ 250/214.1 |
| 2006/0192130 A1* | 8/2006 | Yagi ........................ 250/370.14 |
| 2008/0226031 A1 | 9/2008 | Yokoyama et al. .......... 378/98.7 |
| 2009/0323897 A1 | 12/2009 | Kameshima et al. .... 250/370.09 |

* cited by examiner

IMAGING APPARATUS, RADIATION IMAGING SYSTEM, CONTROLLING METHOD OF IMAGING APPARATUS, AND RECORDING MEDIUM RECORDING CONTROL PROGRAM OF IMAGING APPARATUS

BACKGROUND OF THE INVENTION

1. Field of the Invention

The present invention relates to an imaging apparatus, a radiation imaging system, and a controlling method of the imaging apparatus suitably used for medical diagnosis or industrial non-destructive tests. The term "radiation" herein includes x-rays, electromagnetic waves such as γ-rays, and particulate beams such as α-rays and β-rays.

2. Description of the Related Art

In recent years, a radiation imaging apparatus using a flat radiation detection portion (or Flat Panel Detector, hereinafter referred to as a "FPD") made of semiconductor material has been in practical use as an imaging apparatus used for medical image diagnosis or non-destructive tests with x-rays. The radiation imaging apparatus using the FPD is capable of digital photographing, and can convert radiation such as x-rays that has passed through a subject such as a patient into an analog electric signal with the FPD and perform analog/digital conversion of the analog electric signal to obtain a digital image signal. FPDs are mainly classified into a direct conversion type FPD and an indirect conversion type FPD. The direct conversion type radiation imaging apparatus includes FPDs that has a plurality of pixels arranged two-dimensionally, where each of the pixels includes a conversion element made of semiconductor material such as a-Se that can directly convert radiation into an electric charge. The indirect conversion type radiation imaging apparatus includes FPDs that have a plurality of pixels arranged two-dimensionally, where each of the pixels includes a conversion element having a wavelength converter such as a fluorescent material that can convert radiation into light and a photoelectric conversion element made of semiconductor material such as a-Si that can convert light into electric charges. An indirect conversion type radiation imaging apparatus is disclosed, for example, in U.S. Patent Application Publication No. 2002/0050940. The radiation imaging apparatus including the FPD can convert a radiation image into digital information, and can practically instantaneously transmit image information over a distance. The radiation imaging apparatus including such an FPD is used as a digital imaging apparatus for general photography to obtain a still image and fluoroscopy to obtain a moving image, for example, in medical image diagnosis. U.S. Patent Application Publication No. 2002/0050940 discloses an imaging apparatus using a signal processing apparatus that can read out an image signal from a converting portion at high speed without reducing the S/N ratio, the converting portion including pixels arranged in a matrix, where each of the pixels includes a conversion element.

A converting portion of an imaging apparatus disclosed in U.S. Patent Application Publication No. 2002/0050940 includes a plurality of pixels arranged in a matrix, where each of the pixels includes a conversion element converting radiation or light into electric charges and an output switch element performing an output operation of outputting an electric signal based on the electric charges. A plurality of drive wires is arranged in a column direction, and each of the drive wires is commonly connected to the plurality of pixels in a row direction. An outputting drive circuit is connected to the drive wires, and applies row by row a drive signal for controlling the output operation to the pixels through the drive wires. Thus, the outputting drive circuit controls the converting portion so as to perform the output operation row by row. Further, the converting portion outputs row by row the electric signals from the pixels in parallel, and thus a plurality of signal wires for transmitting the electric signal is arranged in the row direction, and each of the signal wires is commonly connected to output terminals of the output switch elements of the plurality of pixels in the column direction. The signal wires of the converting portion are connected to a read-out circuit, and the read-out circuit reads out the electric signal output from the pixel in the converting portion through the signal wire in parallel, converts the signal into a serial electric signal, and outputs the serial electric signal.

When the electric signal from the converting portion is read out by the read-out circuit in such an imaging apparatus, the below described operations are performed. First, a predetermined constant potential is provided to the signal wire and the read-out circuit to reset a transmitting path (here, the signal wire). An operation for resetting the transmitting path such as the signal wire is referred to as a reset operation. Then, a drive signal is provided to a drive wire in a first row, and an output switch element in the first row performs the output operation to output an electric signal from a pixel in the first row to the signal wire. The electric signal output to the signal wire is sampled and temporarily held by a temporary storage unit such as a sampling and holding circuit provided for each signal wire in the read-out circuit. This operation is referred to as a sampling and holding operation. After the electric signal is held by the sampling and holding circuit, the transmitting path is again reset to be ready for an output operation in the next row. Then, a drive signal is provided to a drive wire in a second row, and an output switch element in the second row performs an output operation to output an electric signal from a pixel in the second row to a signal wire. As such, the reset operation, the output operation, and the sampling and holding operation are performed row by row, and image signals for one image are read out from the converting portion to the read-out circuit. The operation of reading out the image signals for one image from the converting portion to the read-out circuit is referred to as a "read-out operation".

In such an imaging apparatus, the drive wire and the signal wire in the converting portion are arranged with an intersection. Thus, a potential change component due to a potential change of a leading edge or a trailing edge of a drive signal applied to the drive wire is mixed into an electric signal transmitted through the signal wire via a capacitance at the intersection. Further, when a transistor having a control terminal (gate) and two main terminals (source and drain) as output switch elements is used, a potential change component is mixed into an electric signal transmitted via a capacitance between gate and source (Cgs). In U.S. Patent Application Publication No. 2002/0050940, the output operation is performed between the reset operation and the sampling and holding operation in the transmitting path such as the signal wire. Thus, the potential change component due to the leading edge of the drive signal is canceled by the potential change component due to the trailing edge of the drive signal, and the potential change does not influence the output and held electric signal.

SUMMARY OF THE INVENTION

However, the potential change component due to the trailing edge of the drive signal depends on resistance of the drive wire and the capacitance at the intersection and takes a long time to converge to a predetermined potential. Further, when the transistor having the control terminal (gate) and the two main terminals (source and drain) is used as the output switch element, the potential change component also depends on the resistance of the drive wire and Cgs and takes a long time to converge to a predetermined potential. If the sampling and holding operation is performed before the mixed potential change component is dissipated, the output and held electric signal is influenced by the potential change, resulting in increased noise components, thereby reducing the signal-to-noise ratio (S/N ratio) of the image signal obtained by the imaging apparatus. Thus, a sampling and holding operation must be performed after a predetermined wait time to allow the potential change component to converge to a predetermined potential after termination of the output operation. This predetermined time is required row by row, and for example, 1000 predetermined wait times are required for image signals for one image to be obtained from a converting portion including pixels in 1000 rows and 1000 columns Thus, it is difficult to reduce the time (frame time) required for reading out image signals for achieving moving image photographing of, for example, 30 frames per second without reducing the S/N ratio.

Thus, in view of the above described problems, the present invention has an object to provide an imaging apparatus or a radiation imaging apparatus that can reduce the frame time without reducing the S/N ratio of the image signal.

An imaging apparatus comprising: a conversion unit including a plurality of pixels arranged in a matrix, where each of the pixels includes a conversion element converting radiation or light into electric charges and an output switch element performing an output operation of outputting an electric signal based on the electric charges; an outputting drive circuit controlling row by row the output operation of the conversion unit; a transmitting path transmitting the electric signal outputted; a read-out circuit performing a sampling and holding operation for holding the electric signal read out through the transmitting path, and performing a reset operation to reset the transmitting path; and a control unit for controlling the outputting drive circuit and the read-out circuit so as to perform the sampling and holding operation after the start of the output operation, to perform the reset operation after the sampling and holding operation, and to terminate the output operation after the reset operation.

A controlling method of an imaging apparatus comprising a conversion unit including a plurality of pixels arranged in a matrix, where each of the pixels includes a conversion element converting radiation or light into electric charges and an output switch element performing an output operation of outputting an electric signal based on the electric charges and a transmitting path transmitting the electric signal outputted, the method comprising steps, performed row by row of the pixels, of: performing a sampling and holding operation for holding the electric signal read out through the transmitting path, after the start of the output operation; performing a reset operation to reset the transmitting path, after the sampling and holding operation; and performing a termination of the output operation after the reset operation.

A computer readable recording medium recording a program for controlling a computer to execute controlling of an imaging apparatus comprising a conversion unit including a plurality of pixels arranged in a matrix, where each of the pixels includes a conversion element converting radiation or light into electric charges and an output switch element performing an output operation of outputting an electric signal based on the electric charges and a transmitting path transmitting the electric signal outputted, the program controlling the computer to execute steps, row by row of the pixels, of: performing a sampling and holding operation for holding the electric signal read out through the transmitting path, after a start of the output operation; performing a reset operation to reset the transmitting path, after the sampling and holding operation; and performing a termination of the output operation after the reset operation.

The present invention can provide an imaging apparatus or a radiation imaging apparatus that can reduce the frame time without reducing the S/N ratio of the image signal.

Further features of the present invention will become apparent from the following description of exemplary embodiments with reference to the attached drawings.

DESCRIPTION OF THE EMBODIMENTS

Preferred embodiments of a radiation imaging apparatus will be now described in detail with reference to the drawings, as an imaging apparatus to which the present invention is applied.

First Embodiment

Figure 1:
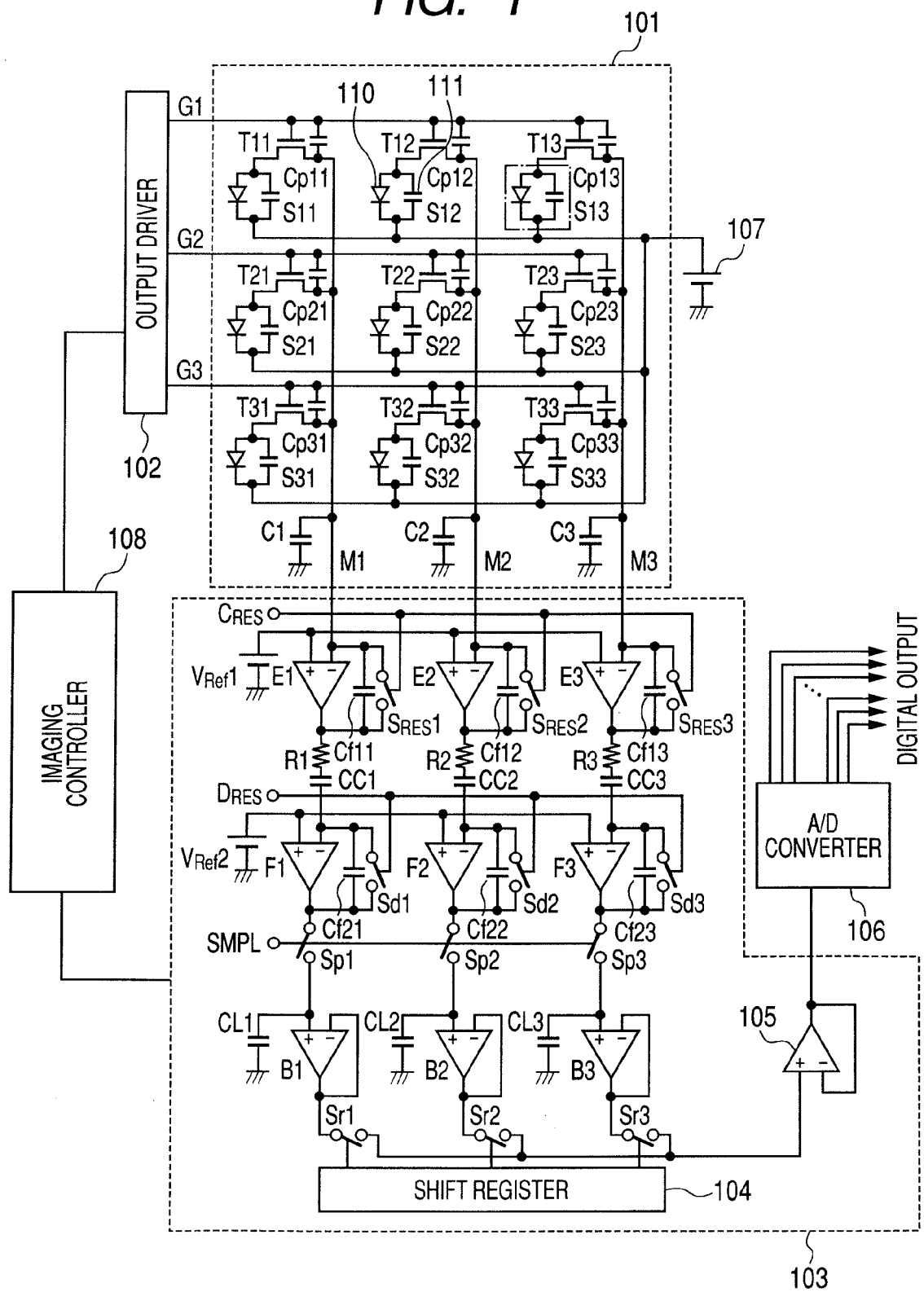
FIG. 1 is an equivalent circuit diagram of a radiation imaging apparatus according to a first embodiment of the present invention.

FIG. 1 is an equivalent circuit diagram of a radiation imaging apparatus according to a first embodiment of the present invention. In FIG. 1, a plurality of pixels is arranged in a matrix, where each of the pixels includes a conversion element Smn converting incident radiation or light into electric charges and an output switch element Tmn performing an output operation of outputting an electric signal based on the electric charges from the conversion element Smn. In this embodiment, the conversion element used is a photoelectric conversion element converting light into electric charges, and a wavelength converter converting radiation into light and the photoelectric conversion element are used in combination for converting radiation into electric charge. The photoelectric conversion element includes a light receiving region 110 converting incident light into electric charge, and a capacitance 111 storing the converted electric charge. A suitably used photoelectric conversion element is, for example, an MIS or PIN photoelectric conversion element using a hydrogenated amorphous silicon film. As the conversion element converting radiation into electric charge, an element made of material such as amorphous selenium (a-Se) that can directly convert radiation into electric charge may be used. A suitable output switch element in the present embodiment is a thin film transistor (hereinafter referred to as a "TFT") provided on an insulating substrate such as a glass substrate and using a non-single-crystal semiconductor such as amorphous silicon. In the present invention, the output switch element is not limited to a TFT, but for example, other switch elements such as a switch element of a diode may be used. One of two main terminals of the output switch element is electrically connected to one of two electrodes of the conversion element. A drive wire Gm is commonly connected to control terminals of output switch elements Tm1 to Tm3 in an m-th row (here, m is a natural number indicating the row number). Specifically, a plurality of drive wires is arranged in a column direction, and each of the drive wires is commonly connected to the plurality of pixels in a row direction. A signal wire M transmitting an output electric signal is commonly connected to the other of the two main terminals of output switch elements T1n to T3n in an n-th row (again, n is a natural number indicating the column number). Specifically, a plurality of signal wires is arranged in the row direction, and each of the signal wires is commonly connected to the plurality of pixels in the column direction. A bias power supply 107 applying a bias to the conversion element through a bias wire is electrically connected to the other of the two electrodes of the conversion element Smn A converting unit 101 includes the plurality of pixels, drive wires, signal wires, and bias wires, an output operation is performed row by row, and an electric signal can be output in parallel from the plurality of pixels in the row direction.

An outputting drive circuit 102 is electrically connected to the drive wire Gm, and applies row by row a drive signal for controlling the output operation to the pixel through the drive wire Gm. The outputting drive circuit 102 controls the converting unit 101 so as to perform the output operation row by row. In this embodiment, a shift register (SR1) is used as the outputting drive circuit 102. A drive signal output from the outputting drive circuit 102 has a leading edge, a Hi state, a trailing edge, and a Lo state. In this embodiment, the leading edge determines a start of the output operation and the output switch element enters a conducting state, and the Hi state maintains the conducting state of the output switch element to perform the output operation. The trailing edge determines the termination of the output operation and the output switch element enters a non-conducting state, and the Lo state maintains the non-conducting state of the output switch element.

A read-out circuit 103 is electrically connected to the signal wire Mn, reads out in parallel the electric signal output from the pixel through the signal wire, converts the electric signal into a serial electric signal, and outputs an image signal as the serial electric signal. The read-out circuit 103 performs a sampling and holding operation for holding temporarily the electric signal read out through the signal wire, and performs a reset operation to reset a transmitting path such as the signal wire. In the read-out circuit 103 in the embodiment, at the most upstream of the signal wire Mn correspondingly to the signal wire Mn in the n-th row, a first calculation amplifier En is provided for inputting at an inverting input terminal the electric signal read out through the signal wire Mn, and amplifying and outputting the electric signal from an output terminal. A first integral capacitance Cf1n and a first reset switch $S_{RES}n$ are connected between the inverting input terminal and the output terminal of the first calculation amplifier En. The first reset switch $S_{RES}n$ provides a predetermined constant potential from a first reference power supply $V_{REF}1$ electrically connected to a non-inverting input terminal to the signal wire Mn and the first integral capacitance Cf1n. Thus, the first reset switch $S_{RES}n$ can reset the signal wire Mn and the first integral capacitance Cf1n. A low-pass filter including a resistance Rn and a capacitance CCn having one terminal connected in series to the resistance Rn is connected to the output terminal of the first calculation amplifier En. The capacitance CCn has a function of passing only an AC component of a signal. At the other terminal (downstream of the low-pass filter) of the capacitance CCn, a second calculation amplifier Fn is provided for inputting at the inverting input terminal the electric signal read out through the first calculation amplifier En and the low-pass filter, and amplifying and outputting the electric signal from the output terminal A second integral capacitance Cf2n and a second reset switch Sdn are connected between the inverting input terminal and the output terminal of the second calculation amplifier Fn. The second reset switch Sdn provides a predetermined constant potential from a second reference power supply $V_{REF}2$ electrically connected to the non-inverting input terminal to a second integral capacitance Cf2n to reset the second integral capacitance Cf2n. In the embodiment, a transmitting path for transmitting an electric signal output from the pixel to a below described sampling and holding circuit includes the signal wire Mn, the first calculation amplifier En, the first integral capacitance Cf1n, the second calculation amplifier Fn, and the second integral capacitance Cf2n. The transmitting path is not limited to the above described construction, but combinations of a signal wire and a known resistance, capacitance, amplifier can be suitably used. The sampling and holding circuit including a sampling switch Spn and a sampling capacitance CLn is connected to the output terminal of the second calculation amplifier. The sampling switch Spn samples an electric signal read out through the signal wire Mn, the first calculation amplifier En, the low-pass filter, and the second calculation amplifier Fn. The sampling capacitance CLn temporarily holds the sampled electric signal, and has one terminal connected to an output terminal of the sampling switch Spn and the other terminal secured to a constant potential such as the ground. A connection between the output terminal of the sampling switch Spn and the one terminal of the sampling capacitance (an output portion of the sampling and holding circuit) is electrically connected to a non-inverting input terminal of a buffer amplifier Bn. The buffer amplifier Bn converts impedance of a signal input to the non-inverting input terminal and outputs the signal from the output terminal. An input terminal of a read-out switch Sm is connected to an output terminal of the buffer amplifier Bn, and a shift register 104 successively scanning the read-out switch Sm is connected to a control terminal of the read-out switch Sm. Read-out switches Sr1 to Sr3 and the shift register 104 constitute a multiplexer successively outputting electric signals read out in parallel and converting the electric signals to serial electric signals, and outputting the serial electric signals as image signals. Output terminals of the read-out switches Sr1 to Sr3 commonly, that is, output terminals of the multiplexer are electrically connected to a non-inverting input terminal of an output buffer amplifier 105, and the output buffer amplifier 105 converts impedance of the image signal and outputs the image signal. The read-out circuit 103 includes at least a sampling and holding circuit provided for each signal wire, and a multiplexer successively outputting electric signals read out in parallel to the plurality of sampling and holding circuits and outputting image signals as serial electric signals.

An analog image signal output from the read-out circuit 103 is converted into a digital image signal by an analog-digital converter (hereinafter referred to as an "A/D converter") 106, and the converted digital image signal is output from the A/D converter 106. In the present embodiment, the A/D converter 106 is separately provided downstream of the read-out circuit 103, but the present invention is not limited to this. The A/D converter may be located in the read-out circuit, and further, an A/D converter may be provided for each signal wire. In this case, the sampling and holding circuit in the present embodiment can be replaced by a memory that can temporarily store a digital image signal.

Operations of the outputting drive circuit 102 and the read-out circuit 103 are controlled by an imaging controller 108. The imaging controller 108 provides a start pulse for starting the output operation or a clock pulse for determining timing of the output operation to the outputting drive circuit 102 to control the operation of the outputting drive circuit 102. The imaging controller 108 provides various signals such as a first control signal $C_{RES}$, a second control signal $D_{RES}$, and a sampling signal SMPL to the read-out circuit 103 to control the operation of the read-out circuit 103. The first control signal $C_{RES}$ determines the reset operation in which the first reset switch $S_{RES}1n$ resets the signal wire Mn and the first integral capacitance Cf1n. The second control signal $D_{RES}$ determines an operation in which the second reset switch Sdn resets the second integral capacitance Cf2n. The sampling signal SMPL determines the sampling and holding operation for temporarily holding the electric signal read out. The imaging controller 108 provides a start pulse for starting a parallel-serial conversion operation or a clock pulse for determining timing of the parallel-serial conversion operation to the shift register 104 of the read-out circuit 103.

Figure 2:
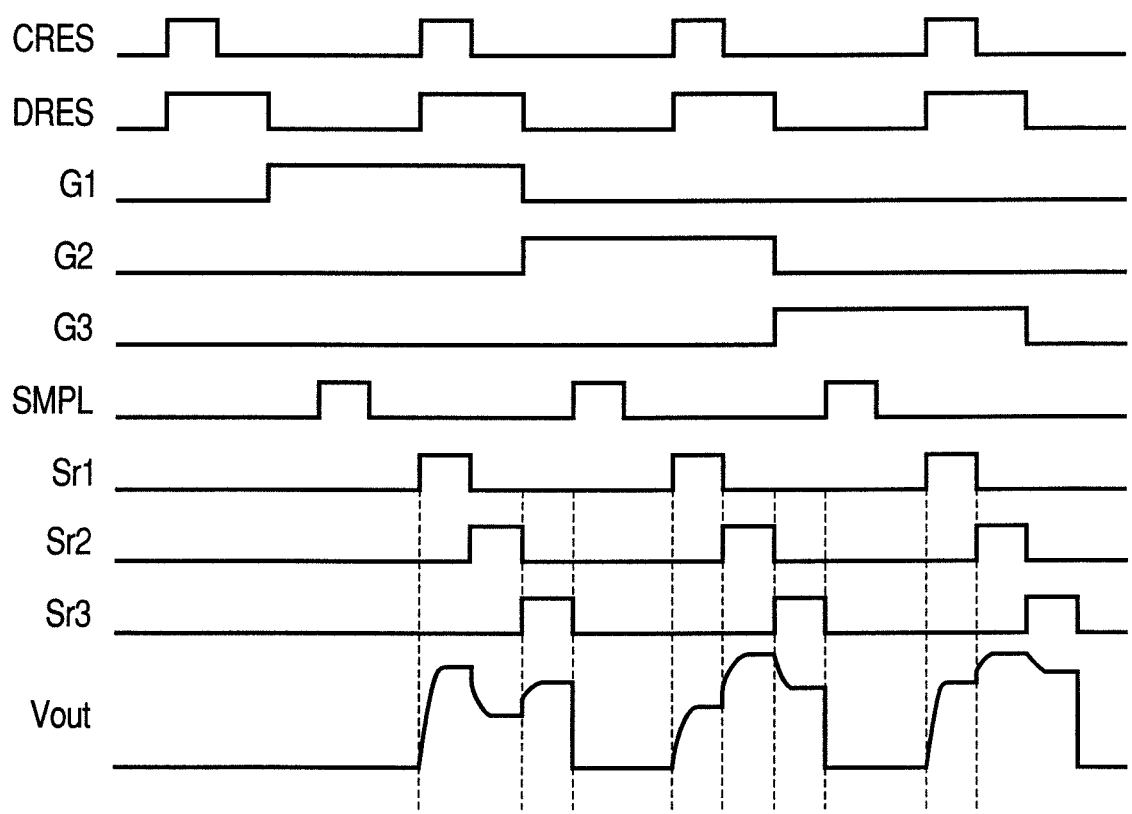
FIG. 2 is a timing chart of the radiation imaging apparatus according to the first embodiment of the present invention.

Next, with reference to FIGS. 1 and 2, a read out operation of the radiation imaging apparatus according to the present embodiment will be described. FIG. 2 is a timing chart of the radiation imaging apparatus according to the first embodiment of the present invention.

First, the imaging controller 108 provides the first control signal $C_{RES}$ and the second control signal $D_{RES}$ to the read-out circuit 103 to perform a reset operation for reset of signal wires M1 to M3, first integral capacitances Cf11 to Cf13, and second integral capacitances Cf21 to Cf23. The reset operation is performed for initializing the transmitting path, and is performed by the first reset switch $S_{RES}n$ and the second reset switch Sdn in the present embodiment. The reset operation is not limited to this, but for example, a reset switch electrically connected to a signal wire may be separately provided. In this case, the reset switch is included in the read-out circuit.

Next, after a termination of the reset operation, the outputting drive circuit 102 provides a drive signal to a drive wire G1 in a first row, and output switch elements T11 to T13 enter a conducting state to start an output operation in the first row. The start of the output operation in the first row is determined by the leading edge of the drive signal provided to the drive wire in the first row. An electric signal of a pixel in the first row output by the output operation is output through the signal wires M1 to M3 to the first integral capacitances Cf11 to Cf13 of the first calculation amplifiers E1 to E3. The electric signal amplified by the first calculation amplifiers E1 to E3 and the first integral capacitances Cf11 to Cf13 is output to second integral capacitances Cf21 to Cf23 of second calculation amplifiers F1 to F3. Then, the imaging controller 108 provides a sampling signal SMPL to sampling switches Sp1 to Sp3. Thus, the sampling and holding operation is performed for temporarily holding the electric signal amplified by the second calculation amplifiers F1 to F3 and the second integral capacitance in the sampling capacitances CL1 to CL3 via the sampling switches Sp1 to Sp3. After termination of the sampling and holding operation, the imaging controller 108 provides the first control signal $C_{RES}$ and the second control signal $D_{RES}$ to the read-out circuit 103. Thus, the reset operation is performed for reset of the signal wires M1 to M3, the first integral capacitances Cf11 to Cf13, and the second integral capacitances Cf21 to Cf23. The electric signals temporarily held in the sampling capacitances CL1 to CL3 are successively output by the multiplexer including the read-out switches Sr1 to Sr3 and the shift register 104, and output from the read-out circuit 103 as image signals for one row. Then, after termination of the reset operation, application of the drive signal to the drive wire G1 in the first row is terminated, and the output switch elements T11 to T13 enter a non-conducting state to terminate the output operation in the first row. The termination of the output operation in the first row is determined by the trailing edge of the drive signal provided to the drive wire in the first row.

Next, after the termination of the output operation in the first row, the outputting drive circuit 102 provides a drive signal to a drive wire G2 in a second row, and output switch elements T21 to T23 enter a conducting state to start an output operation in the second row. The start of the output operation in the second row is determined by the leading edge of the drive signal provided to the drive wire in the second row. Electric signals of pixels in the second row output by the output operation are temporarily held in the sampling capacitances CL1 to CL3 by the sampling and holding operation as in the first row. After termination of the sampling and holding operation, a reset operation is performed as in the first row. The electric signals temporarily held in the sampling capacitances CL1 to CL3 are output from the read-out circuit 103 as image signals for one row as in the first row. Then, after termination of the reset operation, application of the drive signal to the drive wire G2 in the second row is terminated, and the output switch elements T21 to T23 enter a non-conducting state to terminate the output operation in the second row. The termination of the output operation in the second row is determined by the trailing edge of the drive signal provided to the drive wire in the second row.

Figure 3:
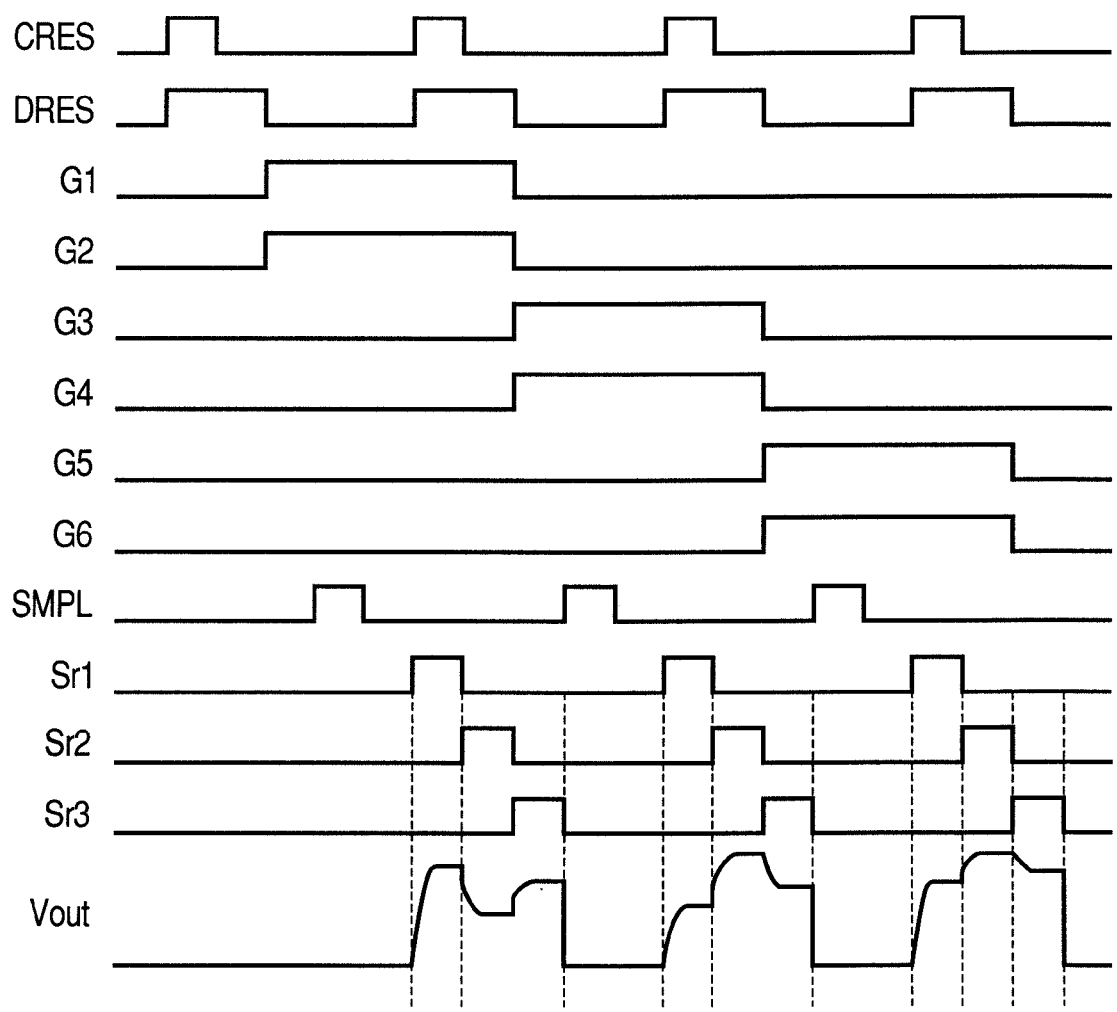
FIG. 3 is a timing chart of another example of a radiation imaging apparatus according to the first embodiment of the present invention.

Then, after termination of the output operation in the second row, the outputting drive circuit 102 provides a drive signal to a drive wire G3 in a third row, and output switch elements T31 to T33 enter a conducting state to start an output operation in the third row. The start of the output operation in the third row is determined by the leading edge of a drive signal provided to a drive wire in the third row. Electric signals of pixels in the third row output by the output operation are temporarily held in the sampling capacitances CL1 to CL3 by the sampling and holding operation as in the first and second rows. After termination of the sampling and holding operation, a reset operation is performed as in the first and second rows. The electric signals temporarily held by the sampling capacitances CL1 to CL3 are output from the read-out circuit 103 as image signals for one row as in the first and second rows. After termination of the reset operation, application of the drive signal to the drive wire G3 in the third row is terminated, and the output switch elements T31 to T33 enter a non-conducting state to terminate the output operation in the third row. The termination of the output operation in the third row is determined by the trailing edge of the drive signal provided to the drive wire in the third row. As described above, the read-out operation is performed for outputting the image signals for one screen from the converting unit 101 including the plurality of pixels in three rows and three columns. Specifically, in the present invention, the imaging controller 108 controls the outputting drive circuit 102 and the read-out circuit 103 so as to perform the sampling and holding operation row by row after the start of the output operation, the reset operation after the sampling and holding operation, and the termination of the output operation after the reset operation. In the present embodiment, the read-out operation of the converting unit 101 including the plurality of pixels in three rows and three columns is described. The present invention is not limited to this, but may be applied to a converting unit including a larger number of pixels. In the present embodiment, the example of the operations performed in the order of the first, second, and third rows is described, but the present invention is not limited to this. The operations may be successively performed in each row at different timing, and for example, the order may be the first, third, and second rows. Further, in the present embodiment, the example of successively performing the operations one row by one row is described, but the present invention is not limited to this. For example, the operations may be successively performed with a plurality of rows as one unit, for example, the operations may be performed simultaneously in two rows, and successively performed two rows by two rows. Such an example is illustrated in FIG. 3, which is a timing chart of another example of the radiation imaging apparatus according to the first embodiment. In FIG. 3, operations are performed simultaneously in two rows and successively performed two rows by two rows for a plurality of pixels in six rows and six columns.

Next, noting the electric signal read out from the pixel in the second row, the electric signal read out from the present invention will be described.

First, the signal wire Mn as the transmitting path, the first integral capacitance Cf1$n$ and the second integral capacitance Cf2$n$ are reset by the reset operation. Then, the output operation in the first row is terminated. An output voltage V1$n$ of the first calculation amplifier at the termination of the output operation in the first row is expressed by the following formula (1):

$$V1n=V_{REF}1\pm(Qgs1n/Cf1) \quad (1)$$

where Cf1 is a capacitance value of the first integral capacitance, $V_{REF}1$ is a voltage value of the first reference power supply $V_{REF}1$, and Qqs1$n$ is an electric charge injected via a parasitic capacitance due to the first row.

Next, an electric signal based on an electric charge Q2$n$ in each pixel in the second row is read out by the output operation and output from the first calculation amplifier to be ready for the sampling and holding operation. An output voltage V1$n$ of the first calculation amplifier before the sampling and holding operation in the second row is expressed by the following formula (2):

$$V1n=V_{REF}1+(Qgs1n/Cf1)-(Q2n/Cf1)-(Qgs2n/Cf1) \quad (2)$$

where Qqs2$n$ is an electric charge mixed via a parasitic capacitance due to the second row.

An electric charge Qgs1$n$ mixed at the termination of the output operation in the first row is expressed by the following formula (3):

$$Qgs1n=(Vgon-Vgoff)/Cgs1n \quad (3)$$

where Vgon is a voltage in a Hi state of the drive signal, Vgoff is a voltage in a Lo state, and Cgs1$n$ is a parasitic capacitance value due to the first row.

An electric charge Qgs2$n$ mixed at a start of the output operation in the second row is expressed by the following formula (4):

$$Qgs2n=(Vgon-Vgoff)/Cgs2n \quad (4)$$

where Cgs2$n$ is a parasitic capacitance value due to the second row.

The parasitic capacitance value Cgs1$n$ due to the first row and the parasitic capacitance value Cgs2$n$ due to the second row are formed close to each other in the converting unit 101, and thus the converting unit 101 is prepared so that the values are substantially equal. Thus, the following formula (5) is expressed:

$$Cgs1n=Cgs2n, Qgs1n=Qgs2n \quad (5)$$

From the formulas (3) to (5), the output voltage V1$n$ of the first calculation amplifier before the sampling and holding operation in the second row in the formula (2) is expressed by the following formula (6):

$$V1n=V_{REF}1-(Q2n/Cf1) \quad (6)$$

As described above, according to the present invention, an output operation in a predetermined row is terminated after a reset operation, and then an output operation and a sampling and holding operation are begun after the start of the output operation in a row different from the predetermined row. Thus, potential change components due to the leading edge and the trailing edge of the drive signal are canceled, and the potential change components do not influence the electric signal that is output and held. Also, according to the present invention, the sampling and holding operation and the reset operation can be performed between the start and the termination of the output operation. Thus, it is not necessary that the sampling and holding operation is deferred until after a predetermined wait time to allow a potential change component of a signal wire to converge to a predetermined potential after termination of an output operation as in U.S. Patent Application Publication No. 2002/0050940. Thus, the present invention can reduce the frame time without reducing the S/N ratio of the image signal.

Second Embodiment

Figure 4:
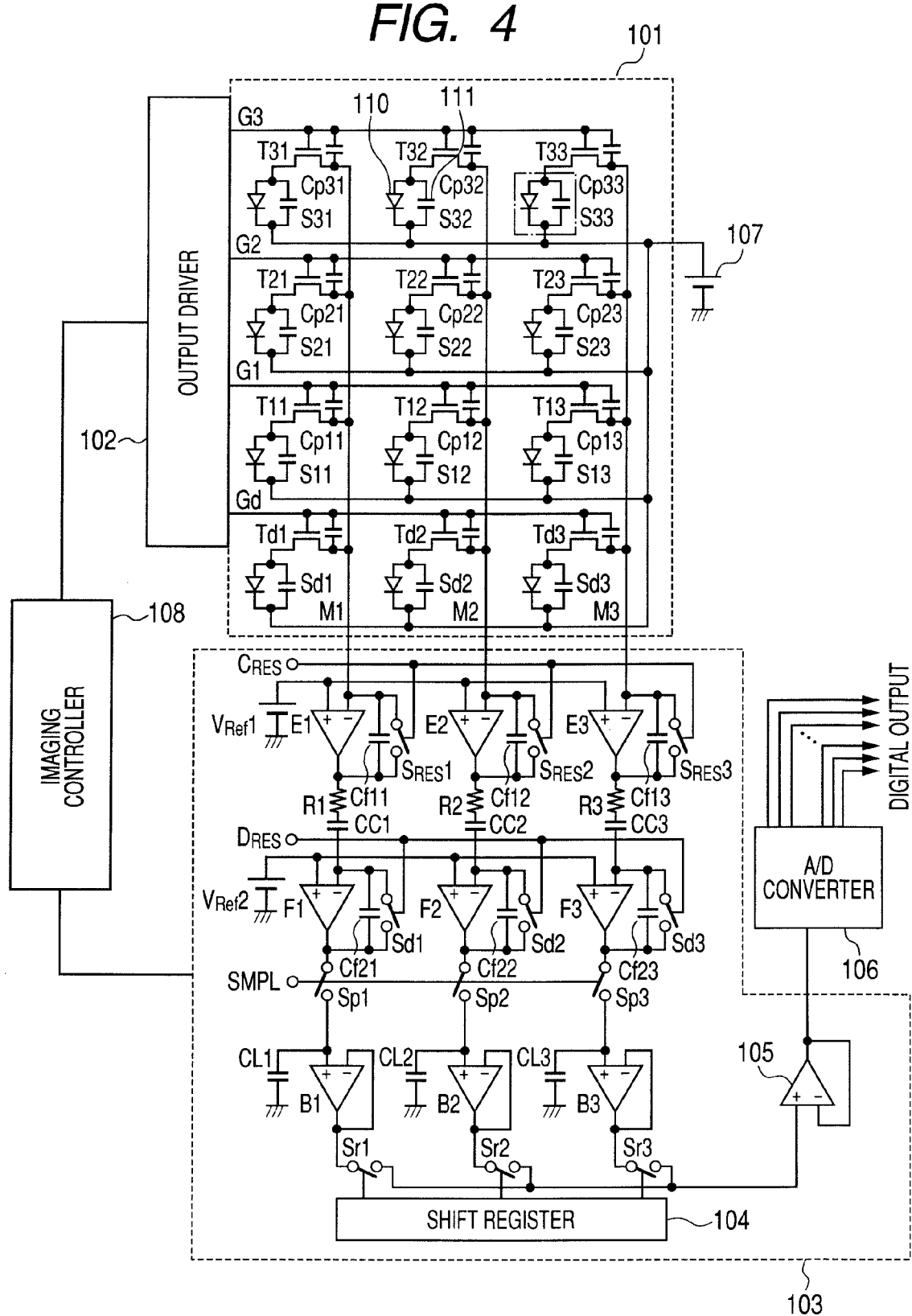
FIG. 4 is an equivalent circuit diagram of a radiation imaging apparatus according to a second embodiment of the present invention.
Figure 5:
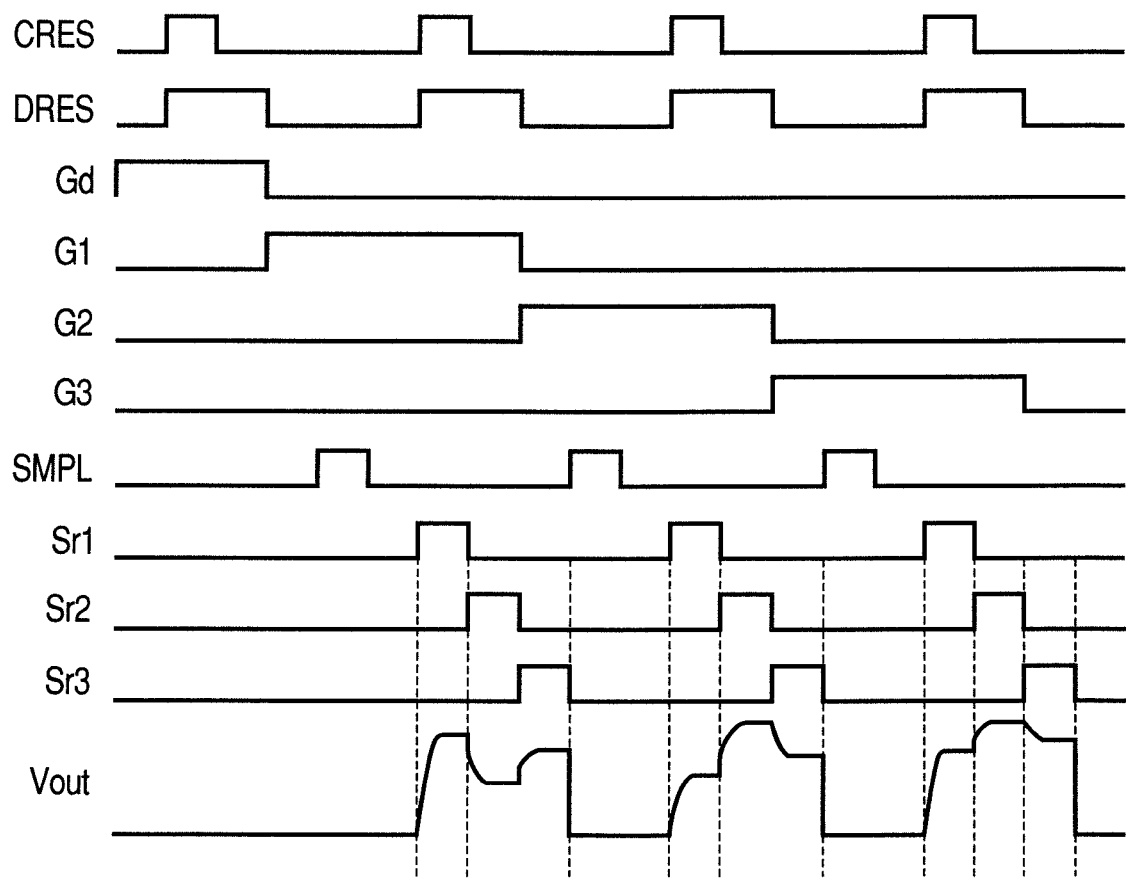
FIG. 5 is a timing chart of the radiation imaging apparatus according to the second embodiment of the present invention.

FIG. 4 is an equivalent circuit diagram of a radiation imaging apparatus according to a second embodiment of the present invention. FIG. 5 is a timing chart of the radiation imaging apparatus according to the second embodiment of the present invention. In FIGS. 4 and 5, the components described in the first embodiment are denoted by the same reference numerals, and detailed descriptions thereof will be omitted. Different parts from the first embodiment will be now described in detail.

In the first embodiment, noting the electric signal read out from the pixel in the first row, the influence of the potential change of the signal wire Mn due to the leading edge of the drive signal in the first row is not canceled because there is no row with the output operation before the first row unlike the second row. Thus, an output voltage V1$n$ of the first calculation amplifier before the sampling and holding operation in the first row is expressed by the following formula (7):

$$V1n=V_{REF}1-(Q1n/Cf1)-(Qgs1n/Cf1) \quad (7)$$

Specifically, in the first embodiment, the electric charge Qgs1$n$ due to the leading edge of the drive signal in the first row is mixed into the electric signal output from the pixel in the first row to the signal wire Mn via the parasitic capacitance due to the first row. In this case, the read-out operation may be performed without separate incident light to subtract (Qgs1$n$/Cf1) in an image processing, which may press an output voltage range of the first calculation amplifier En.

Thus, in the present embodiment, a dummy pixel Td is provided in the converting unit 101 separately from the plurality of pixels described above. The dummy pixel is not used for converting radiation or light into electric charge, or an electric signal based on the converted electric charge is not used as image data. A dummy row including a plurality of dummy pixels Tdn in a row direction is provided. For example, as the dummy pixel, a pixel having the same constructions of the conversion element and the output switch element as the other elements and having a shield member shielding radiation or light incident on the conversion element is suitably used. The parasitic capacitance due to the dummy pixel and the dummy row is desirably substantially equal to a parasitic capacitance due to other pixels and other rows. A drive signal provided to a drive wire Gd of the dummy pixel in the dummy row is desirably substantially equal to the drive signal provided to the drive wire Gm of the plurality of pixels. In the present embodiment, the example of the dummy pixel having the shield member is described, but the present invention is not limited to this. A dummy pixel without a shield member can function as a dummy pixel unless an electric signal read out is used as image data. Specifically, the first row in the first embodiment may be used as a dummy pixel and a dummy row.

In the present embodiment, the outputting drive circuit 102 first provides a drive signal to the drive wire Gd in the dummy row, and an output switch element Tdn enters a conducting state to start an output operation of the output switch element Tdn of the dummy pixel and start the output operation in the dummy row. Then, during the output operation in the dummy row, the imaging controller 108 provides a first control signal $C_{RES}$ and a second control signal $D_{RES}$ to the read-out circuit 103 to perform a reset operation. Then, after termination of the reset operation, application of the drive signal to the drive wire Gd is terminated, and the output switch element Tdn enters a non-conducting state to terminate the output operation in the dummy row. Specifically, in the present embodiment, a start of the output operation in the dummy row, a reset operation during the output operation in the dummy row, and termination of the output operation in the dummy row after the reset operation are performed before a start of a sampling and holding operation in a row where the output operation is first performed among the plurality of pixels.

Thus, an output voltage V1n of the first calculation amplifier before the sampling and holding operation in the first row in the present embodiment is expressed in the following formula (8):

$$V1n = V_{REF}1 + (Qgsdn/Cf1) - (Q1n/Cf1) - (Qgs1n/Cf1) \quad (8)$$

where Qqsdn is an electric charge mixed via a parasitic capacitance due to the dummy row.

An electric charge Qgsdn mixed at termination of the output operation in the dummy row is expressed by the following formula (9):

$$Qgsdn = (Vgon - Vgoff)/Cgsdn \quad (9)$$

where Cgsdn is a parasitic capacitance value due to the dummy pixel in the dummy row.

The parasitic capacitance due to the dummy pixel and the dummy row is set to be substantially equal to the parasitic capacitance due to other pixels and other rows and expressed by the following formula (10):

$$Cgs1n = Cgsdn, Qgs1n = Qgsdn \quad (10)$$

From formulas (9) and (10), the output voltage V1n of the first calculation amplifier before the sampling and holding operation in the first row in the present embodiment expressed by formula (8) is expressed by the following formula (11):

$$V1n = V_{REF}1 - (Q1n/Cf1) \quad (11)$$

As described above, according to the present embodiment, a potential change component of the signal wire due to the leading edge of the drive signal in the first row is canceled by a potential change component of the signal wire due to the trailing edge of the drive signal in the dummy row, and the potential change component does not influence the electric signal in the first row. Thus, noise of the electric signal in the first row is reduced as compared with in the first embodiment, allowing a more satisfactory S/N ratio for the obtained image signal.

Third Embodiment

Figure 6:
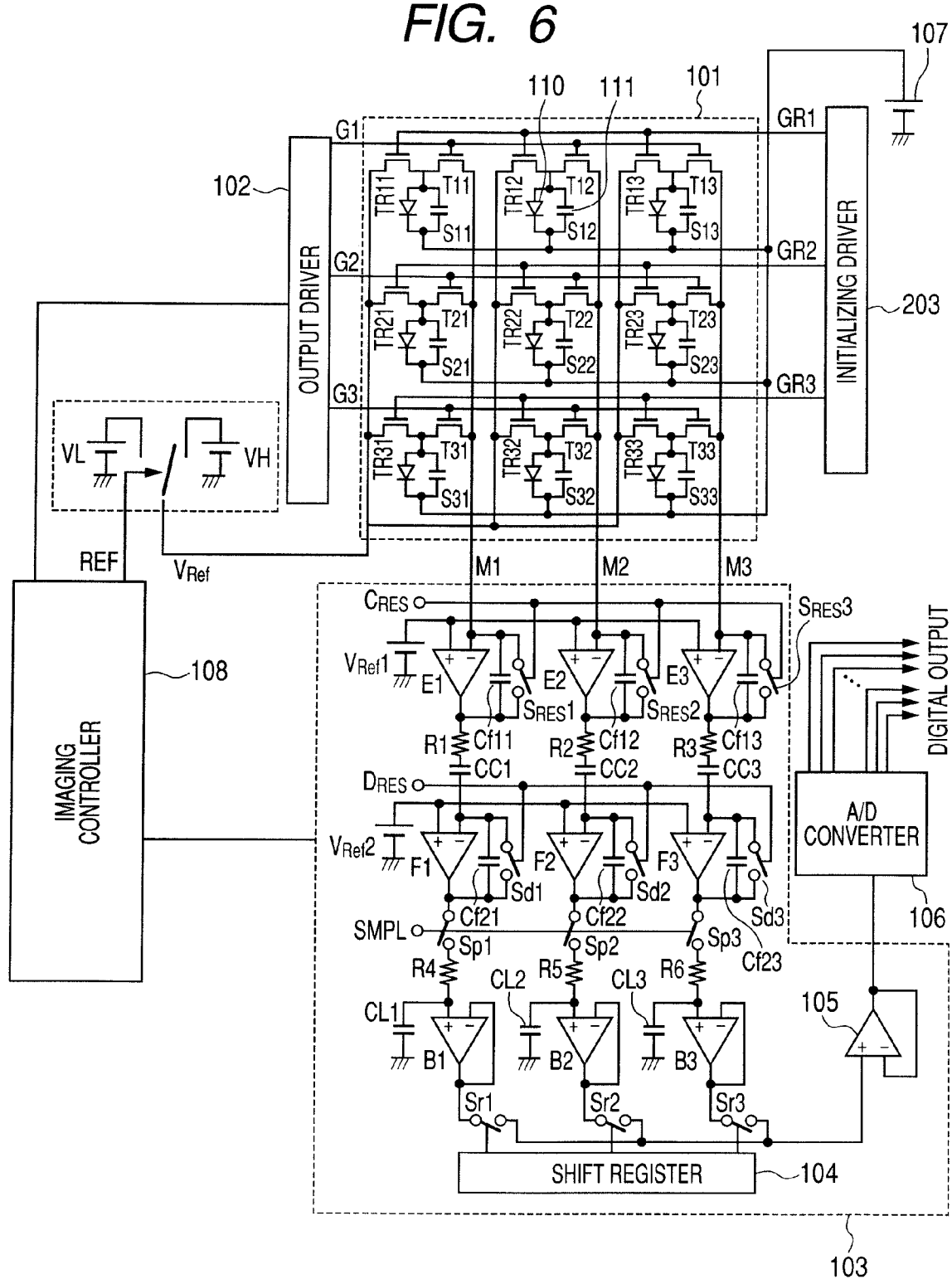
FIG. 6 is an equivalent circuit diagram of a radiation imaging apparatus according to a third embodiment of the present invention.
Figure 7:
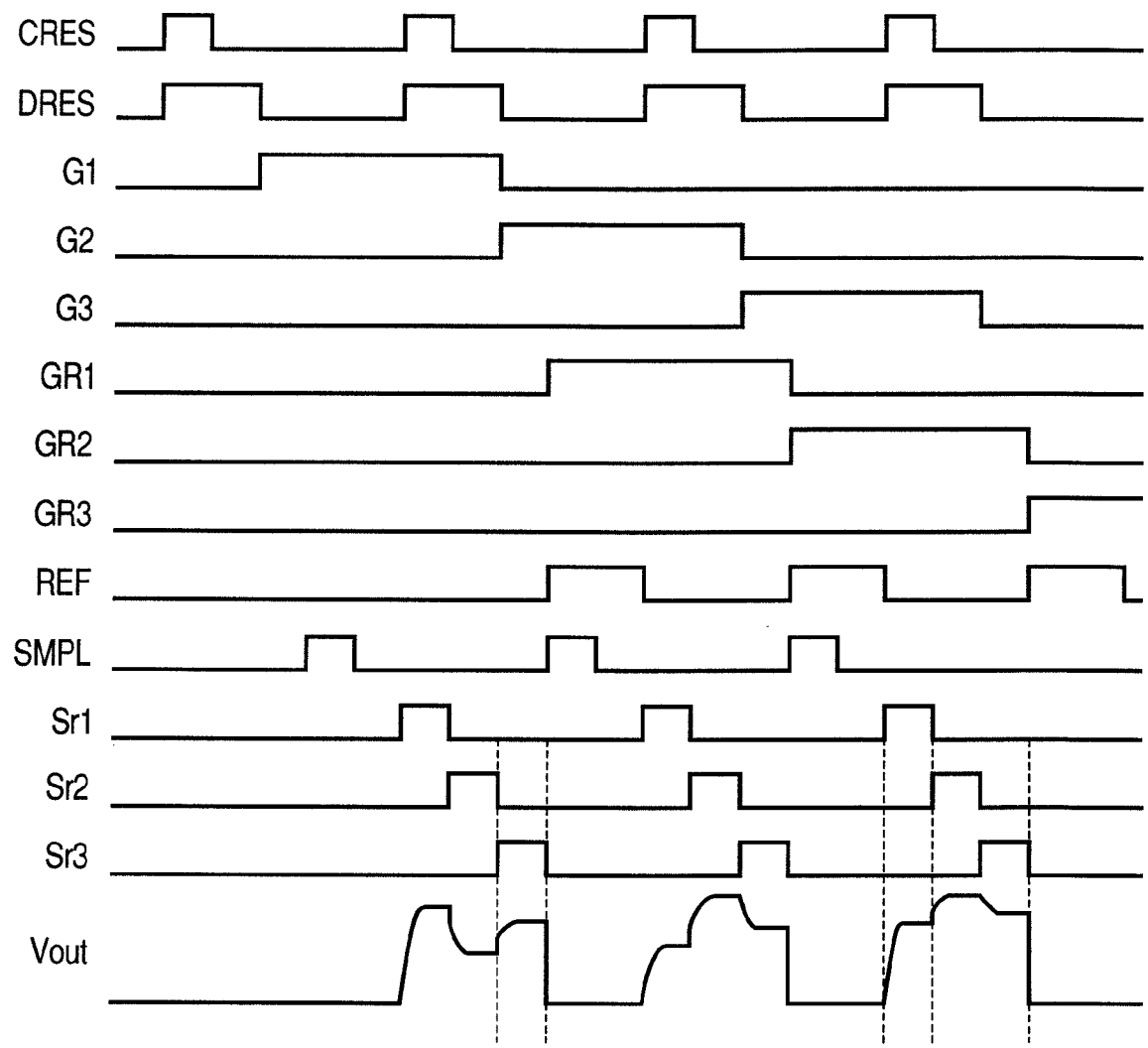
FIG. 7 is a timing chart of the radiation imaging apparatus according to the third embodiment of the present invention.

FIG. 6 is an equivalent circuit diagram of a radiation imaging apparatus according to a third embodiment of the present invention. FIG. 7 is a timing chart of the radiation imaging apparatus according to the third embodiment of the present invention. In FIGS. 6 and 7, the components descried in the first embodiment are denoted by the same reference numerals, and detailed descriptions thereof will be omitted. Different parts from the first embodiment will be now described in detail.

A pixel in the present embodiment includes an initializing switch element TRmn in addition to a conversion element Smn and an output switch element Tmn. The initializing switch element TRmn performs an initializing operation for setting the conversion element Smn at a nearly initial state. When, for example, an MIS photoelectric conversion element is used as the conversion element, refresh described in Japanese Patent Application Laid-Open No. H09-307698 corresponds to the initializing operation. When, for example, a PIN photodiode is used as the conversion element, an operation for releasing a carrier remaining in a photodiode after an output operation by an output switch element Tmn with an initializing switch element TRmn corresponds to the initializing operation.

One of two main terminals of the initializing switch element TRmn and one of the two main terminals of the output switch element Tmn are commonly electrically connected to one electrode of the conversion element Smn. The other of the two main terminals of the initializing switch element TRmn is electrically connected to the initializing power supply. The initializing power supply provides an initializing voltage for the conversion element Smn performing the initializing operation and a converting voltage for the conversion element Smn performing a converting operation to the conversion element Smn. The converting operation is to bring about a state in which a bias is applied so as to expand a depletion layer formed in a semiconductor layer in the conversion element and incident radiation or light can be converted into electric charge. Each voltage is applied from the initializing power supply to the conversion element Smn via the initializing switch TRmn. An initializing drive wire GRm is commonly connected to control terminals of initializing switch elements TRmn in an m-th row.

An initializing drive circuit 203 is electrically connected to the initializing drive wire GRm, and applies row by row a drive signal for controlling the initializing operation to a pixel through the drive wire GRm. The initializing drive circuit 203 controls the converting unit 101 so as to perform the initializing operation row by row. In the present embodiment, a shift register (SR3) is used as the initializing drive circuit 203. The drive signal output from the initializing drive circuit 203 has a leading edge, a Hi state, a trailing edge, and a Lo state. In the present embodiment, the leading edge determines a start of the initializing operation and the initializing switch element enters a conducting state, and the Hi state maintains the conducting state of the initializing switch element to perform the initializing operation. Then, the trailing edge determines termination of the initializing operation and the initializing switch element enters a non-conducting state, and the Lo state maintains the non-conducting state of the initializing switch element. In the present embodiment, the imaging controller 108 controls the initializing drive circuit 203 and the initializing power supply in addition to the outputting drive circuit 102 and the read-out circuit 103.

Next, with reference to FIGS. 6 and 7, a read-out operation of the radiation imaging apparatus of the present embodiment will be described. Also in the present embodiment, a reset operation is performed as in the first embodiment. Then, after termination of the reset operation, an output operation in the first row is started as in the first embodiment. Electric signals of pixels in the first row output by the output operation are temporarily held in the sampling capacitances CL1 to CL3 by the sampling and holding operation as in the first embodiment. After termination of the sampling and holding operation, a reset operation is performed as in the first embodiment. The electric signals temporarily held in the sampling capacitances CL1 to CL3 are output from the read-out circuit 103 as in the first embodiment. Then, after termination of the reset operation, the output operation in the first row is terminated as in the first embodiment.

Then, after the termination of the output operation in the first row, an output operation in the second row is started as in the first embodiment. Then, the imaging controller 108 provides a control signal REF to the initializing power supply to switch from the converting voltage to the initializing voltage. Then, the initializing drive circuit 203 provides a drive signal to an initializing drive wire GR1 in the first row, and initializing switch elements TR11 to TR13 enter a conducting state to start the initializing operation in the first row. The start of the initializing operation in the first row is determined by a leading edge of a drive signal provided to the initializing drive wire in the first row. Electric signals of pixels in the second row output by the output operation are temporarily held in the sampling capacitances CL1 to CL3 by the sampling and holding operation as in the first row. After termination of the sampling and holding operation, provision of the control signal REF from the imaging controller 108 to the initializing power supply is terminated to switch from the initializing voltage to the converting voltage. Then, a reset operation is performed as in the first row. The electric signals temporarily held in the sampling capacitances CL1 to CL3 are output from the read-out circuit 103 as image signals for one row as in the first row. Then, after termination of the reset operation, application of the drive signal to the drive wire G2 in the second row is terminated as in the first row, and output switch elements T21 to T23 enter a non-conducting state to terminate the output operation in the second row.

Then, after the termination of the output operation in the second row, an output operation in a third row is started as in the first embodiment. The start of the output operation in the third row is determined by a leading edge of a drive signal provided to a drive wire in the third row. Then, application of the drive signal to the initializing drive wire GR1 in the first row is terminated, and initializing switch elements TR11 to TR13 enter a non-conducting state to terminate the initializing operation in the first row. The termination of the initializing operation in the first row is determined by a trailing edge of the drive signal provided to the initializing drive wire in the first row. Then, the imaging controller 108 provides the control signal REF to the initializing power supply to switch from the converting voltage to the initializing voltage. Then, the initializing drive circuit 203 provides a drive signal to an initializing drive wire GR2 in the second row, and initializing switch elements TR21 to TR23 enter a conducting state to start the initializing operation in the second row. The start of the initializing operation in the second row is determined by a leading edge of the drive signal provided to the initializing drive wire in the second row. Electric signals of pixels in the third row output by the output operation are temporarily held in the sampling capacitances CL1 to CL3 by the sampling and holding operation as in the first and second rows. After termination of the sampling and holding operation, provision of the control signal REF from the imaging controller 108 to the initializing power supply is terminated to switch from the initializing voltage to the converting voltage. Then, a reset operation is performed as in the first and second rows. Electric signals temporarily held in the sampling capacitances CL1 to CL3 are output from the read-out circuit 103 as image signals for one row as in the first and second rows. Then, after termination of the reset operation, application of a drive signal to the drive wire G3 in the third row is terminated, output switch elements T31 to T33 enter a non-conducting state to terminate the output operation in the third row. The termination of the output operation in the third row will be determined by the trailing edge of the drive signal provided to the drive wire in the third row.

Then, after termination of the output operation in the third row, application of the drive signal to the initializing drive wire GR2 in the second row is terminated, and the initializing switch elements TR21 to TR23 enter a non-conducting state to terminate the initializing operation in the second row. The termination of the initializing operation in the second row is determined by the trailing edge of the drive signal provided to the initializing drive wire in the second row. Then, the imaging controller 108 provides the control signal REF to the initializing power supply to switch from the converting voltage to the initializing voltage. Then, the initializing drive circuit 203 provides the drive signal to the initializing drive wire GR3 in the third row, and the initializing switch elements TR31 to TR33 enter a conducting state to start the initializing operation in the third row. The start of the initializing operation in the third row is determined by a leading edge of the drive signal provided to the initializing drive wire in the third row. After the same time as in the first and second rows has passed, provision of the control signal REF from the imaging controller 108 to the initializing power supply is terminated to switch from the initializing voltage to the converting voltage. After the same time as in the first and second rows has passed, application of the drive signal to the initializing drive wire GR3 in the third row is terminated, and the initializing switch elements TR31 to TR33 enter a non-conducting state to terminate the initializing operation in the third row. The termination of the initializing operation in the third row is determined by the trailing edge of the drive signal provided to the initializing drive wire in the third row.

As described above, in the present embodiment, the initializing operation is performed row by row during the read out operation for outputting image signals for one screen from the converting unit 101 including the plurality of pixels in three rows and three columns. Specifically, in the present embodiment, between a start of an output operation and a sampling and holding operation for a pixel in a predetermined row, termination of an initializing operation for a pixel in a different row from the predetermined row and a start of an initializing operation for a pixel in a further different row from the predetermined row and the different row are performed.

With the above described construction, the initializing operation can be performed row by row using the initializing switch element TRmn in the present embodiment. Thus, a frame rate is increased as compared with the case where reinitializing operation is collectively performed for the entire converting unit 101 before the converting operation or after the read out operation described in Japanese Patent Laid-Open Application No. H09-307698. In the present embodiment, the sampling and holding operation after the start of the output operation, the reset operation after the sampling and holding operation, and the termination of the output operation after the reset operation are performed row by row. Further, between the start of the output operation and the sampling and holding operation for the pixel in the predetermined row, the termination of the initializing operation of the pixel in the different row from the predetermined row and the start of the initializing operation of the pixel in the further different row from the predetermined row and the different row are performed. Thus, the imaging apparatus that can perform row by row the initializing operation can further reduce the frame time without reducing the S/N ratio of the image signal.

In the present embodiment, the converting unit including the plurality of pixels in three rows and three columns is described, but the present invention is not limited to this. For example, the converting unit may include a larger number of pixels such as in 1000 rows and 1000 columns. In the present embodiment, as in the first embodiment, the electric charge due to the leading edge of the drive signal applied to the drive wire G1 in the first row is mixed into the electric signal output from the pixel in the first row to the signal wire Mn. Further, the electric charge due to the leading edge of the drive signal applied to the initializing drive wire GR1 in the first row is mixed into the electric signal output from the pixel in the second row to the signal wire Mn. Specifically, the potential change component influences the electric signals read out from the pixels in the first and second rows. Thus, as in the second embodiment, at least two dummy rows may be provided in the converting unit 101 separately from the plurality of pixels. Each dummy row includes a plurality of dummy pixels in a row direction, and the dummy pixel has no function of converting an incident radiation or light into an electric charge. Then, the same operation as in the first and second rows in the present embodiment is performed in the dummy rows. Thus, the influence of the leading edge and the trailing edge of the drive signal on the plurality of pixels as effective pixels is cancelled to prevent a reduction in an S/N ratio of an image signal as in the third row in the present embodiment.

Fourth Embodiment

Figure 8:
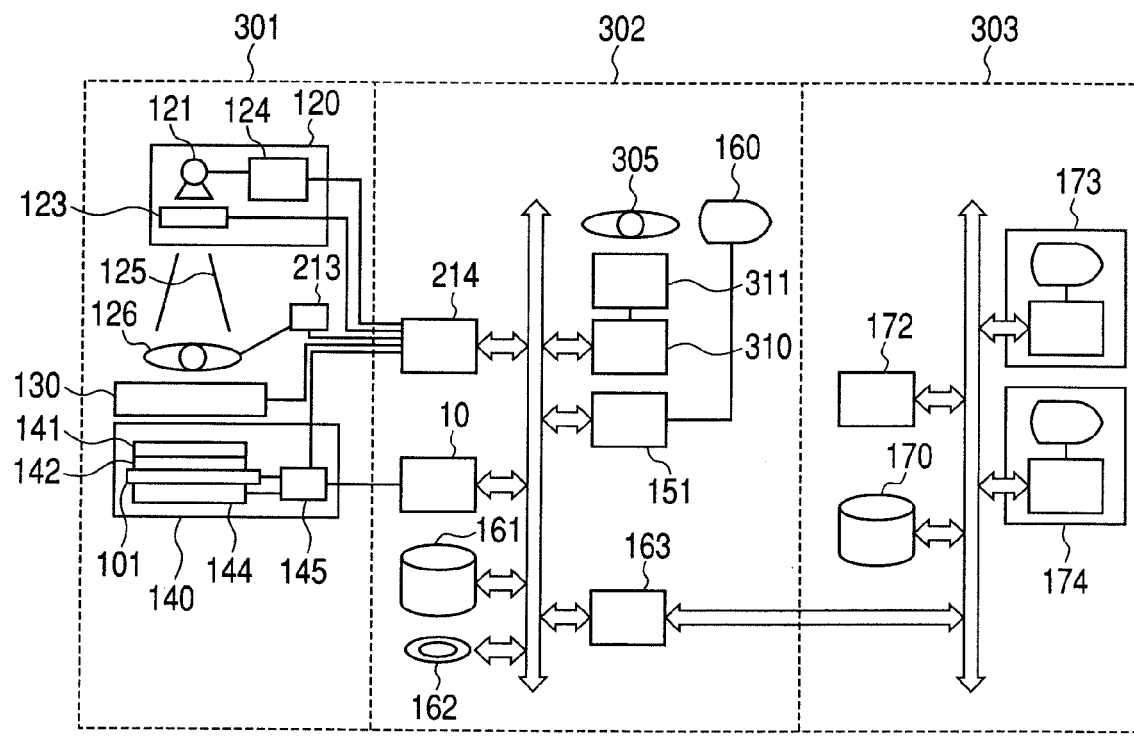
FIG. 8 is a conceptual view of a radiation imaging system according to the present invention.

Next, with reference to FIG. 8, a radiation imaging system according to the present invention will be described. FIG. 8 is a conceptual view of the radiation imaging system according to the present invention.

In FIG. 8, reference numeral 301 denotes a radiation (x-ray) room, reference numeral 302 denotes a control room, and reference numeral 303 denotes a consultation room. General operations of the radiation imaging system are controlled by a system control unit 310. An operator interface 311 includes a touch panel on a display, a mouse, a keyboard, a joystick, or a foot switch. From the operator interface 311, imaging conditions (still image, moving image, tube voltage, tube current, irradiation time) and imaging timing, image processing conditions, subject ID, a captured image processing method can be set. The system control unit 310 gives an instruction on an imaging condition based on an instruction from an operator 305 or a radiation information system to a control device 214 controlling a radiation imaging sequence, and captures data. Based on the instruction, the control device 214 drives an x-ray generation apparatus 120 as a radiation source, an imaging bed 130, and a radiation imaging apparatus 140 to capture image data and transfer the image data to an image processing unit 10. Then, the image data is subjected to image processing specified by the operator and displayed on a display 160, simultaneously subjected to basic image processings such as offset correction, gain correction, and defect correction, and stored in an external storage device 161. Further, the system control unit 310 performs, based on an instruction from the imaging operator 305, image reprocessing, playback display, transfer and storage of image data to or in a device on a network, display on a display device, and printing on a film. In the present invention, the control device 214 gives an instruction to the imaging controller 108 provided in a peripheral circuit unit 145 of the radiation imaging apparatus 140, and the imaging controller 108 controls the outputting drive circuit 102 and the read-out circuit 103 based on the given instruction.

Next, an operation of the radiation imaging system will be described with a flow of a signal. The x-ray generation apparatus 120 includes an x-ray tube 121 and an x-ray aperture 123. The x-ray tube 121 is driven by a high voltage generation power supply 124 controlled by the control unit 214, and emits an x-ray beam 125 as radiation. The x-ray aperture 123 is driven by the control device 214, and shapes the x-ray beam 125 so as to prevent unnecessary x-ray irradiation with changes in the imaging region. The x-ray beam 125 is directed to a subject 126 lying on the radiolucent imaging bed 130. The imaging bed 130 is driven based on an instruction from the control device 214. The x-ray beam 125 passes through the subject 126 and the imaging bed 130 and is then applied to the radiation imaging apparatus 140. The radiation imaging apparatus 140 includes a grid 141, a wavelength converter 142, a converting unit 101, an x-ray exposure amount monitor 144, and a peripheral circuit unit 145. The grid 141 reduces an influence of x-ray scattering caused by the beam passing through the subject 126. The grid 141 includes an x-ray low-absorbent member and an x-ray high-absorbent member and has, for example, a strip structure of Al and Pb. The grid 141 is oscillated based on an instruction from the control device 214 in application of the x-ray beam so as to prevent moiré caused by the relationship of the grid ratio between the converting unit 101 and the grid 141. The converting unit 101 is placed adjacent to the wavelength converter 142. The converting unit 101 converts a photon into an electric charge to read out an electric signal. The x-ray exposure amount monitor 144 monitors an x-ray transmission amount. The x-ray exposure amount monitor 144 may directly detect x-rays using a light receiving element of crystal silicon, or may detect light that has passed through the photoelectric converting unit 101 from the wavelength converter 142. In this example, the x-ray exposure amount monitor 144 detects visible light (proportional to the x-ray amount) that has passed through the converting unit 101 and sends the information to the control unit 214, and the control device 214 drives the high voltage generation power supply 124 based on the information to block or adjust the x-rays.

The image signal from the radiation imaging apparatus 140 is transmitted from the x-ray room 301 to the image processing unit 10 in the x-ray control room 302 as image data. In the transmission, high noise is produced by generation of the x-rays in the x-ray room 301, and the noise may prevent the image data from being properly transmitted. Thus, the transmitting path needs to have high noise resistance. For example, a transmitting path of a differential signal transmitting type such as LVDS (Low Voltage Differential Signaling) using a transmitting system having an error correcting function, or a transmitting path using an optical fiber is desirably used. The image processing unit 10 switches display data based on the instruction from the control device 214. Further, correction (offset correction, gain correction, and defect correction) of the image data, space filtering, and a recursive processing may be performed in real time. Further, a gradation processing, scattering line correction, and various space frequency processings may be performed.

The processed image data is displayed on the display 160 via a display adapter 151. Simultaneously with the real-time image processing, a basic image simply subjected to data correction is stored in the external storage device 161. A desirable external storage device 161 is a data storage device having a large capacitance, high speed and high reliability, and for example, a hard disk array such as an RAID is desirable. The image data stored in the external storage device 161 is stored in the external storage device 161 based on the instruction from the operator. At this time, the image data is reconfigured so as to meet a predetermined standard (for example, IS&C) and then stored in the external storage device. The external storage device is, for example, a magnetooptical disk 162 or a hard disk in a file server 170 on a LAN. The radiation imaging system of the present invention can be connected to the LAN via a LAN board 163, and has data compatibility with HIS. A plurality of radiation imaging systems are connected to the LAN, as are also a monitor 174 displaying at least one of a moving image and a still image and the file server 170 filing the image data. Also, an image printer 172 outputting an image on a film, and an image processing terminal 173 performing a complicated image processing and diagnosis support are connected to the LAN. The radiation imaging system of the present invention outputs image data according to a predetermined protocol (for example, DICOM). Further, a monitor connected to the LAN can be used to perform a real-time remote diagnosis by a clinician in x-ray imaging.

In the first to third embodiments, processing steps of the imaging controller 108 may be achieved by the control device (computer) 214 in the present embodiment performing a program. At this time, a lookup table LUT and the program are stored in the external storage device 161. A unit for providing the program to the computer, for example, a computer-readable recording medium such as a CD-ROM recording the program or a transfer medium such as internet transferring the program may be applied as an embodiment of the present invention. A computer program product such as the computer-readable recording medium recording the program can be applied as an embodiment of the present invention. The program, the recording medium, the transfer medium, and the computer program product are covered by the present invention. The recording medium may include, for example, a flexible disk, a hard disk, an optical disk, a magnetooptical disk, a CD-ROM, a magnetic tape, a nonvolatile memory card, and a ROM.

The present invention relates to a radiation imaging apparatus, and more particularly to a radiation imaging system used for diagnosis in a hospital and a radiation imaging apparatus also used as an industrial non-destructive test apparatus. The present embodiments are suitable for an imaging apparatus using a radiation such as visible light or x-rays, for example, a one-dimensional or two-dimensional imaging apparatus of a radiation imaging apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-118804, filed Apr. 30, 2008, which is hereby incorporated by reference herein in its entirety.

What is claimed is:

1. An imaging apparatus comprising:
a conversion unit including a plurality of pixels arranged in a matrix, wherein each of the pixels includes a conversion element adapted to convert radiation or light into electric charge and an output switch element adapted to perform an output operation of outputting an electric signal based on the electric charge;
an outputting drive circuit controlling row by row the output operation of said conversion unit;
a plurality of signal wires adapted to transmit the electric signal in parallel outputted row by row from said conversion unit;
a read-out circuit having at least an amplifier, an integral capacity, a reset switch, and a sampling and holding circuit, which are provided for each of the signal wires, wherein the amplifier has an inverting input terminal electrically connected to each of the signal wires, the integral capacity is electrically connected to the inverting input terminal and an output terminal of the amplifier, the reset switch is adapted to reset the integral capacity, and the sampling and holding circuit is electrically connected to the output terminal, wherein the read-out circuit is adapted to perform a sampling and holding operation for holding an electric signal read out through a plurality of the amplifiers by a plurality of the sampling and holding circuits, and a reset operation for resetting a plurality of the integral capacities; and
a control unit adapted to control said outputting drive circuit and said read-out circuit to perform, during an interval between a first reset operation that is performed at a first output operation in a predetermined row and a second reset operation that is performed successively to the first reset operation, a termination of the first output operation, a start of a second output operation that is performed successively to the first output operation, and the sampling and holding operation after the start of the second output operation.

2. The imaging apparatus according to claim 1, wherein said conversion unit includes further a dummy pixel provided separately from said plurality of pixels, and
wherein said control unit controls said outputting drive circuit and said read-out circuit, so as to perform a start of the output operation of said dummy pixel, to perform the reset operation of said dummy pixel during the output operation and to terminate the output operation of said dummy pixel after the reset operation of said dummy pixel, before a start of a first of the sampling and holding operations of said plurality of pixels.

3. The imaging apparatus according to claim 1, wherein said pixels each include further an initializing switch element performing an initializing operation for bringing the conversion element of said pixel toward an initial state,
said imaging apparatus further comprising an initializing drive circuit applying, to the pixels row by row, a drive signal for controlling the initializing operation, and a power source for biasing said conversion element, and
wherein said power source applies, to said conversion element, an initializing voltage for setting said conversion element to perform the initializing operation, and a voltage for setting said conversion element to perform a conversion operation of converting the radiation or the light into the electric charge.

4. The imaging apparatus according to claim 3, wherein said control unit controls said outputting drive circuit and said read-out circuit so as to perform, between the start of the output operation and the sampling and holding operation of the pixels in a predetermined row, termination of the initializing operation of the pixels in a row different from the predetermined row and the start of the initializing operation of the pixels in a further row different from the predetermined row and different from the row different from the predetermined row.

5. A radiation imaging system comprising:

an imaging apparatus according to claim 1; and a control apparatus for controlling at least one of said radiation imaging apparatus and a radiation source for irradiating said imaging apparatus with radiation.

* * * * *